US009664816B2

(12) United States Patent
Donderici et al.

(10) Patent No.: US 9,664,816 B2
(45) Date of Patent: May 30, 2017

(54) FRACTURE DETECTION AND CHARACTERIZATION USING RESISTIVITY IMAGES

(71) Applicant: Halliburton Energy Services, Inc., Houston, TX (US)

(72) Inventors: Burkay Donderici, Houston, TX (US); Yumei Tang, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 271 days.

(21) Appl. No.: 14/390,065

(22) PCT Filed: Dec. 6, 2013

(86) PCT No.: PCT/US2013/073520
§ 371 (c)(1),
(2) Date: Oct. 2, 2014

(87) PCT Pub. No.: WO2015/084390
PCT Pub. Date: Jun. 11, 2015

(65) Prior Publication Data
US 2016/0282512 A1    Sep. 29, 2016

(51) Int. Cl.
*E21B 47/00*   (2012.01)
*G01V 1/00*    (2006.01)
(Continued)

(52) U.S. Cl.
CPC .......... *G01V 99/005* (2013.01); *E21B 43/26* (2013.01); *E21B 47/00* (2013.01); *E21B 47/01* (2013.01);
(Continued)

(58) Field of Classification Search
CPC .......... G01V 99/005; G01V 3/26; G01V 3/28; E21B 47/122; E21B 47/01; E21B 43/26; E21B 47/00
(Continued)

(56) References Cited

U.S. PATENT DOCUMENTS

| 6,163,155 A | 12/2000 | Bittar et al. |
| 7,659,722 B2 | 2/2010 | Bittar |

(Continued)

FOREIGN PATENT DOCUMENTS

| GB | 2467415 A | 8/2010 |
| WO | 2007/013883 A2 | 2/2007 |

(Continued)

OTHER PUBLICATIONS

International Search Report and Written Opinion issued in related PCT Application No. PCT/US2013/073520 mailed Sep. 1, 2014, 9 pages.

(Continued)

*Primary Examiner* — Farhana Hoque
(74) *Attorney, Agent, or Firm* — John W. Wustenberg; Baker Botts L.L.P.

(57) ABSTRACT

An example method for fracture identification and characterization may include positioning a magnetic dipole transmitter and a magnetic dipole receiver within a borehole in a subterranean formation. At least one of the magnetic dipole transmitter and the magnetic dipole receiver may be tiled with respect to an axis of the borehole. The magnetic dipole transmitter may generate a time-varying electromagnetic (EM) signal. The magnetic dipole receiver may measure a response of the formation to the time-varying EM signal; the response may include at least two depths of a formation and at least two azimuthal orientations of the formation with respect to the axis of the borehole. An image of the forma- (Continued)

tion may be generated based, at least in part, on the response, and at least one fracture characteristic may be determined based, at least in part, on the first image and a synthetic fracture image.

18 Claims, 11 Drawing Sheets

(51) Int. Cl.
*G01V 99/00* (2009.01)
*E21B 43/26* (2006.01)
*G01V 3/28* (2006.01)
*E21B 47/01* (2012.01)
*E21B 47/12* (2012.01)
*G01V 3/26* (2006.01)

(52) U.S. Cl.
CPC .............. *E21B 47/122* (2013.01); *G01V 3/26* (2013.01); *G01V 3/28* (2013.01)

(58) Field of Classification Search
USPC .................. 324/406; 166/250.01; 367/31
See application file for complete search history.

(56) References Cited

U.S. PATENT DOCUMENTS

| | | |
|---|---|---|
| 2003/0184302 A1 | 10/2003 | Omeragic et al. |
| 2004/0124841 A1 | 7/2004 | Omeragic |
| 2008/0062814 A1* | 3/2008 | Prioul ..................... G01V 1/50 367/31 |
| 2010/0232259 A1 | 9/2010 | Akhtar |
| 2010/0307741 A1* | 12/2010 | Mosse ..................... G01V 3/30 166/250.01 |
| 2010/0312534 A1 | 12/2010 | Xu et al. |
| 2012/0133367 A1 | 5/2012 | Bittar et al. |
| 2013/0027044 A1 | 1/2013 | Minerbo et al. |
| 2013/0201795 A1 | 8/2013 | Zhou et al. |

FOREIGN PATENT DOCUMENTS

| | | |
|---|---|---|
| WO | 2008/115229 A1 | 9/2008 |
| WO | 2009/006975 A2 | 1/2009 |

OTHER PUBLICATIONS

International Preliminary Report on Patentability issued in related Application No. PCT/US2013/073520, mailed Jun. 16, 2016 (6 pages).

* cited by examiner

FRACTURE DETECTION AND CHARACTERIZATION USING RESISTIVITY IMAGES

CROSS-REFERENCE TO RELATED APPLICATION

This application is a U.S. National Stage Application of International Application No. PCT/US2013/073520 filed Dec. 6, 2013, which is hereby incorporated by reference in its entirety.

BACKGROUND

The present disclosure relates generally to well drilling operations and, more particularly, to fracture detection and characterization using resistivity images.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Measurements of the subterranean formation may be made throughout the operations to characterize the formation and aide in making operational decisions. One example measurement corresponds to the electrical resistivity (or its inverse conductivity) of the formation, which can be used to determine whether the formation or a layer of the formation is likely to contain hydrocarbons. Natural fractures or cracks within the formation may skew the measurements, however, reducing the accuracy of the calculated resistivity and the decisions made based on the calculated resistivity.

FIGURES

Some specific exemplary embodiments of the disclosure may be understood by referring, in part, to the following description and the accompanying drawings.

Figure 1:
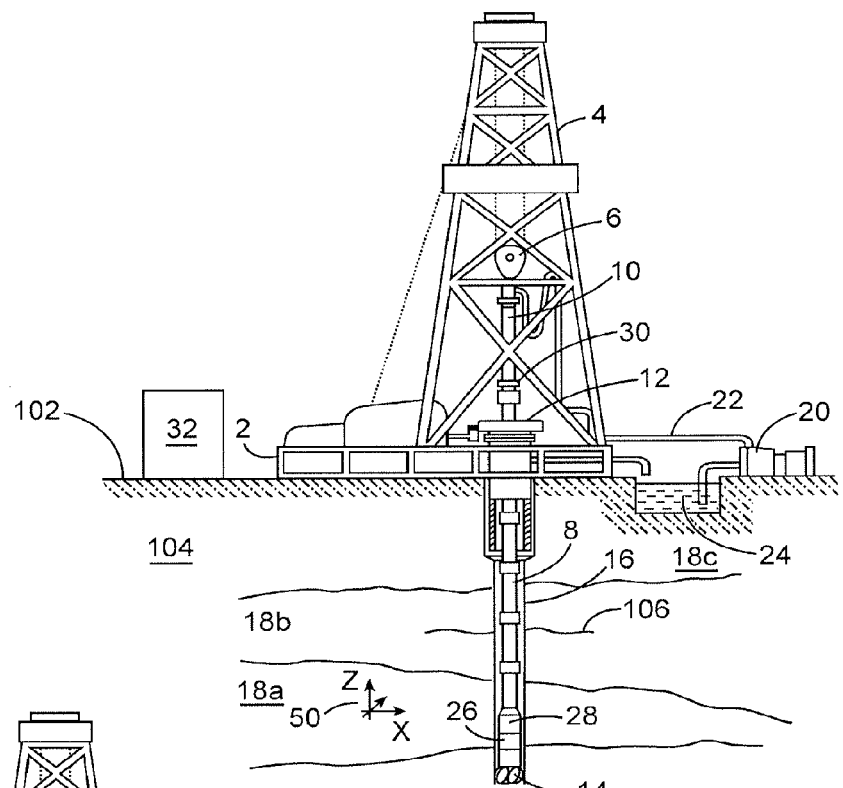
FIG. 1 is a diagram showing an illustrative logging while drilling environment, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

FIG. 1 is a diagram of a subterranean drilling system 100, according to aspects of the present disclosure. The drilling system 100 comprises a drilling platform 2 positioned at the surface 102. In the embodiment shown, the surface 102 comprises the top of a formation 104 containing one or more rock strata or layers 18a-c, and the drilling platform 2 may be in contact with the surface 102. In other embodiments, such as in an off-shore drilling operation, the surface 102 may be separated from the drilling platform 2 by a volume of water.

The drilling system 100 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 100 may comprise a bottom hole assembly (BHA) coupled to the drill string 8 near the drill bit 14. The BHA may comprise various downhole measurement tools and sensors and LWD and MWD elements, including a resistivity logging tool 26. The resistivity logging tool 26 may comprise a plurality of transmitters and receivers (e.g., antennas capable of receiving and/or transmitting one or more electromagnetic signals) such as magnetic dipoles that are axially spaced along the length of the tool and positioned at different angles with respect to the tool 26. As the bit extends the borehole 16 through the formations 18, the resistivity logging tool 26 may collect measurements relating to the resistivity of the formation 104, i.e., how strongly the formation 104 opposes a flow of electric current. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments. In embodiments including an azimuthal orientation indicator, the resistivity measurements may be associated with a particular azimuthal orientation through azimuthal binning, as will be described below.

The tools and sensors of the BHA including the resistivity logging tool 26 may be communicably coupled to a telemetry element 28. The telemetry element 28 may transfer measurements from the resistivity logging tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the resistivity logging tool 26 may also be stored within the tool 26 or the telemetry element 28 for later retrieval at the surface 102.

In certain embodiments, the drilling system 100 may comprise an information handling system 32 positioned at the surface 102. The information handling system 32 may be communicably coupled to the surface receiver 30 and may receive measurements from the resistivity logging tool 26 and/or transmit commands to the resistivity logging tool 26 though the surface receiver 30. The information handling system 32 may also receive measurements from the resistivity logging tool 26 when the tool 26 is retrieved at the surface 102. As will be described below, the information handling system 32 may process the measurements to determine certain characteristics of the formation 104, including the location and characteristics of fractures within the formation 104.

Figure 2:
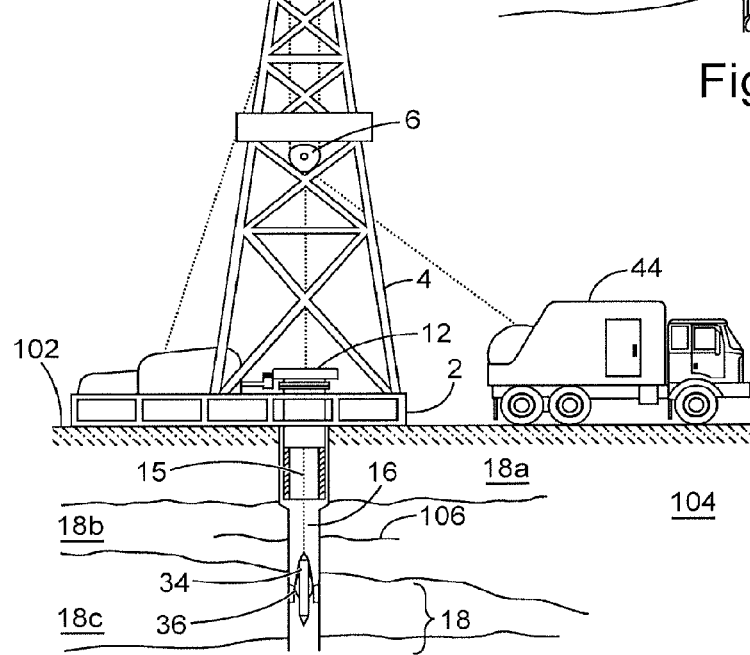
FIG. 2 is a diagram showing an illustrative wireline logging environment, according to aspects of the present disclosure.

At various times during the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may include a resistivity logging tool 36 having transmitters and receivers similar to those described above in relation to the resistivity logging tool 26. The resistivity logging tool 36 may be communicatively coupled to the cable 15. A logging facility 44 (shown in FIG. 2 as a truck, although it may be any other structure) may collect measurements from the resistivity logging tool 36, and may include computing facilities (including, e.g., an information handling system) for controlling, processing, storing, and/or visualizing the measurements gathered by the resistivity logging tool 36. The computing facilities may be communicatively coupled to the logging/measurement tool 36 by way of the cable 15. In certain embodiments, the information handling system 32 may serve as the computing facilities of the logging facility 44.

As described above, FIGS. 1 and 2 show a formation 104 one or more rock strata or layers 18a-c. Each of the strata 18a-c may have different physical and electrical characteristics. For example, some of the strata may be generally conductive while others may be generally resistive. Likewise, some may be generally porous while some may be non-porous. In certain instances, natural fractures or cracks may be located within strata 18a-c. In FIGS. 1 and 2, the borehole 16 intersects a fracture 106 in layer 18b. Fracture 106 may have different characteristics than the rock layer in which it is located, and the different characteristics may skew the measurements of the strata. For example, layer 18b may comprise a resistive layer, yet fracture 106 may contain conductive fluids, or layer 18b may comprise a conductive layer, yet fracture 106 may contain resistive fluids. Identifying, characterizing, and accounting for these fractures may, therefore, improve the resulting measurements of the formation 104 generally and the strata 18a-c in particular.

Figure 3:
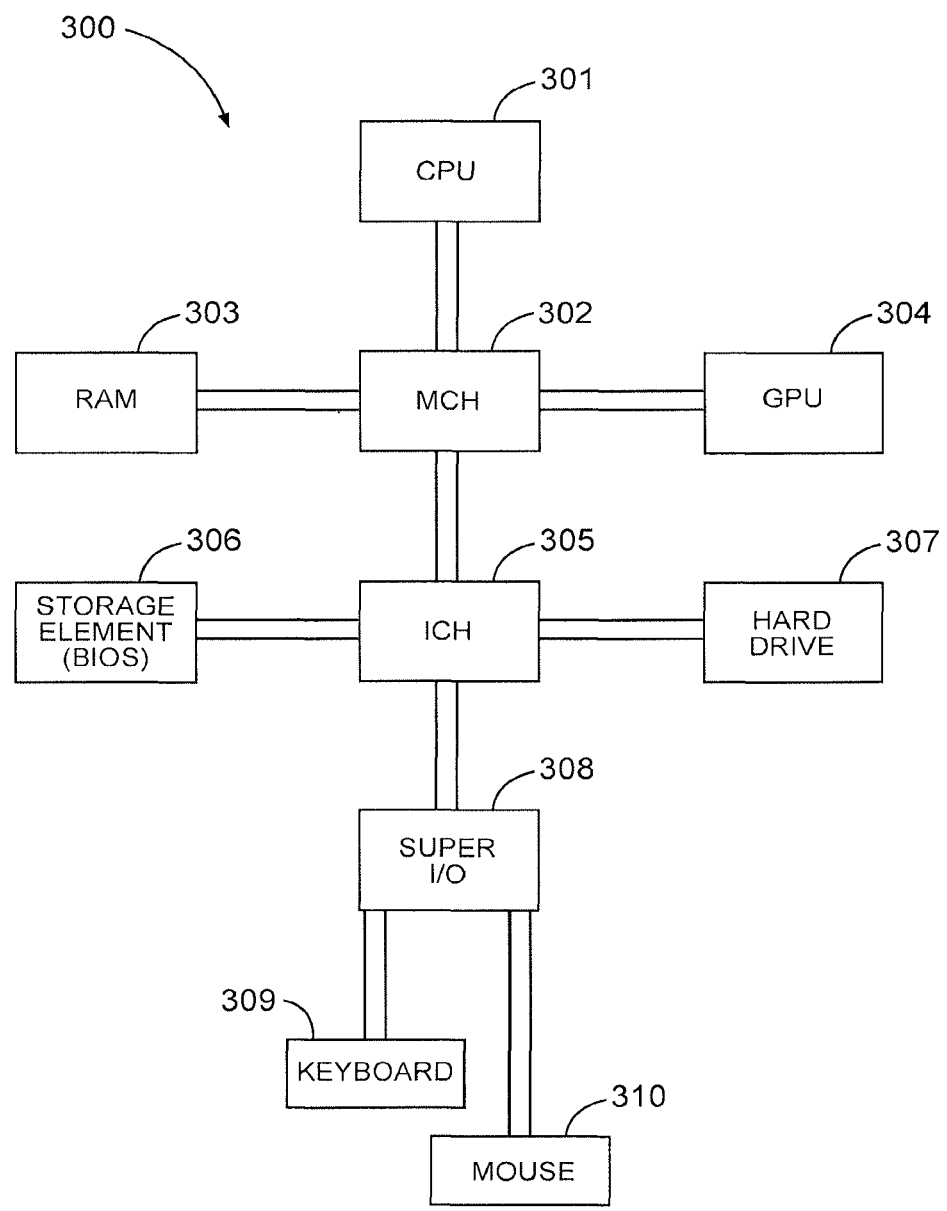
FIG. 3 is a diagram of an example information handling system, according to aspects of the present disclosure.

FIG. 3 is a block diagram showing an example information handling system 300, according to aspects of the present disclosure. Information handling system 300 may be used with the drilling system described above. The information handling system 300 may comprise a processor or CPU 301 that is communicatively coupled to a memory controller hub or north bridge 302. Memory controller hub 302 may include a memory controller for directing information to or from various system memory components within the information handling system, such as RAM 303, storage element 306, and hard drive 307. The memory controller hub 302 may be coupled to RAM 303 and a graphics processing unit 304. Memory controller hub 302 may also be coupled to an I/O controller hub or south bridge 305. I/O hub 305 is coupled to storage elements of the computer system, including a storage element 306, which may comprise a flash ROM that includes a basic input/output system (BIOS) of the computer system. I/O hub 305 is also coupled to the hard drive 307 of the computer system. I/O hub 305 may also be coupled to a Super I/O chip 308, which is itself coupled to several of the I/O ports of the computer system, including keyboard 309 and mouse 310. The information handling system 300 further may be communicably coupled to one or more elements of a drilling system though the chip 308 as well as a visualization mechanism, such as a computer monitor or display.

The information handling system(s) used in the subterranean drilling systems described above may include software components that process and characterize data. As used herein, software or software components may comprise a set of instructions stored within a computer readable medium that, when executed by a processor coupled to the computer readable medium, cause the processor to perform certain actions. According to aspects of the present disclosure, the actions may be performed with respect to measurements from a resistivity logging tool to identify and characterize fractures within a formation.

Figure 4A:
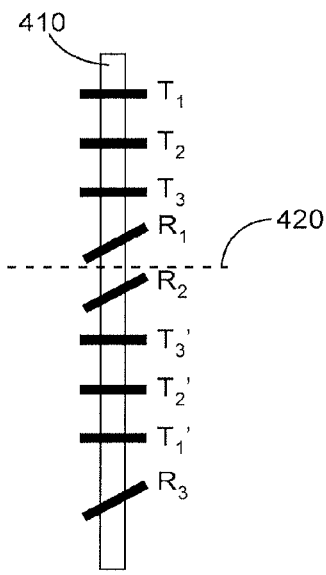
FIG. 4 is a diagram of an example resistivity logging tool, according to aspects of the present disclosure.
Figure 4B:
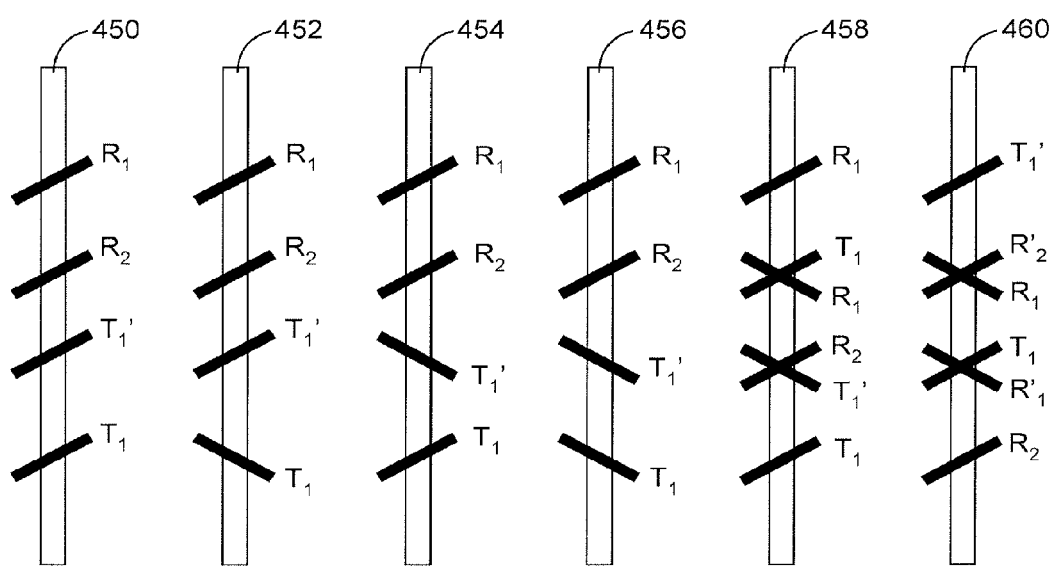

FIGS. 4A and 4B illustrate example resistivity logging tools, according to aspects of the present disclosure. FIG. 4A shows a resistivity logging tool 400 that may be used as an LWD/MWD tool or within a wireline arrangement, described above, and may comprise at least one magnetic dipole transmitter and at least one magnetic dipole receiver. In the embodiment shown, the tool 400 comprises transmitters $T_1$-$T_3$ and $T_1'$-$T_3'$ and receivers $R_1$-$R_3$ axially spaced along the length of the tool 400. The transmitters $T_1$-$T_3$ and $T_1'$-$T_3'$ may be coaxial, as shown, and/or tilted with respect to a tool body 410. The receivers $R_1$-$R_3$ may be tilted and axially spaced apart from the transmitters $T_1$-$T_3$ and $T_1'$-$T_3'$ and from each other with respect to the tool body 410. Because the receivers $R_1$-$R_3$ may be tilted, measurements taken with them may be azimuthally sensitive. In certain embodiments, the transmitters $T_1$-$T_3$ and $T_1'$-$T_3$ and receivers $R_1$-$R_3$ may comprise dipole antennas that may be mounted in recesses in the tool body 410 and protected by a non-conductive material or a material with non-conducting apertures.

In the embodiment shown, the transmitters $T_1$-$T_3$ and $T_1'$-$T_3'$ comprise symmetric coaxial transmitter antennas $T_1$-$T_1'$, $T_2$-$T_2'$, and $T_3$-$T_3'$ spaced at 16-inch increments from a center 420 of the two receivers $R_1$ and $R_2$ Specifically, the transmitters $T_3$-$T_3'$ each may be located 16 inches from the center 420, the transmitters $T_2$-$T_2'$ each may be located 32 inches from the center 420, and the transmitters $T_1$-$T_1'$ each may be located at 48 inches from the center 420. Receivers $R_1$ and $R_2$ may be spaced four inches from each other and tilted at a 45 degree angle with respect to a longitudinal axis of the tool body 410. And receiver $R_3$ may be located 64 inches from the center 420.

As can be seen in FIG. 4B, other configurations for the transmitters and receiver are possible, including the number, spacing, orientation, angle, etc. Specifically, tools 450-460 illustrate tools with different orientations of receivers $R_1$ and $R_2$ and transmitters $T_1$ and $T_1'$. For example, the transmitters and receivers may be parallel, perpendicular, and/or co-located with each other. Additionally, either or both of the receivers $R_1$ and $R_2$ and transmitters $T_1$ and $T_1'$ may be tilted with respect to the axis of the tool. Notably, the distance between a transmitter and a receiver is positively correlated with the range of measurement and negatively correlated with the measurement resolution. Accordingly, having transmitters and receivers located at various distances balances the range and resolution of the tool, with the particular distances chosen based on characteristics of the formation in which the tool will be introduced.

Figure 5:
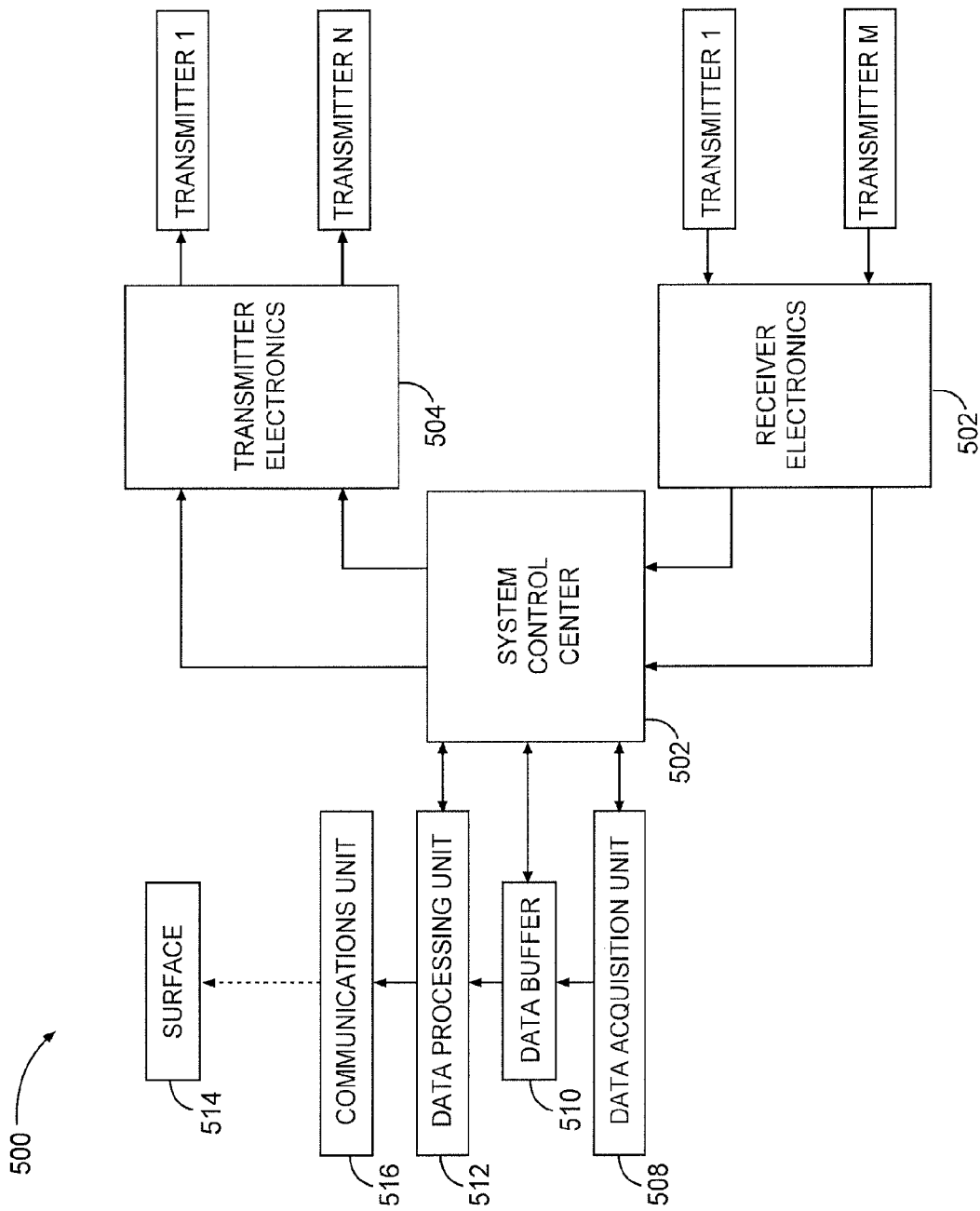
FIG. 5 is a diagram of an example control system for a resistivity logging tool, according to aspects of the present disclosure.

FIG. 5 is a diagram of an example control system 500 for a resistivity logging tool, according to aspects of the present disclosure. The system 500 comprises a system control center 502 that may function as the primary controller for the tool. In certain embodiments, the system control center 302 may comprise an information handling system, and may be communicably coupled to transmitters 1-N through transmitter electronics 504 and communicably coupled to receivers 1-M through receiver electronics 506. The transmitters 1-N and receivers 1-M may comprise coaxial or tilted magnetic dipoles, similar to those described above with reference to FIG. 4. The transmitter electronics 504 and receiver electronics 506 may comprise circuit boards to which some or all of the transmitters 1-N and receivers 1-M are coupled.

The system control center 502 may trigger the transmitter electronics 504 to generate a time-varying electromagnetic (EM) signal through one or more of the transmitters 1-N. The transmitter electronics 504 may trigger each of the transmitters 1-N independently, selecting a transmitter based on the transmitter's orientation (e.g., distance) with respect to the receivers. The time-varying EM signal may be a sinusoidal signal, its phase, amplitude, and frequency set at a desired value. In certain embodiment, the system control center 502 may cause one transmitter to transmit multiple time-varying EM signals, each with a different phase, amplitude, and/or frequency. In certain embodiments, the system control center 502 may cause each of the transmitters 1-N to transmit a different time-varying EM signal, with different phases, amplitudes, and/or frequencies. Other transmission schemes are possible, as would be appreciated by one of ordinary skill in the art in view of this disclosure.

The time-varying EM signals generated by one or more of the transmitters 1-N may excite the formation surrounding the tool, and one or more of the receivers 1-M may measure the response of the formation to the time-varying EM signals. In certain embodiments, one or more of the receivers 1-M may be tuned to measure a response within a frequency band containing the transmitted time-varying EM signal. The system control center 502 may receive the measured responses from the receivers 1-M through the receiver electronics 506 and may transmit the measured responses to the data acquisition unit 508. For a specific transmitter excitation, measured responses from multiple receivers can be received at the same time. Similarly, multiple transmitters 1-N can be excited at the same time and they can be time, frequency or jointly multiplexed for latter demultiplexing operation at the receivers. Upon reception at the data acquisition unit 508, the measured responses may be digitized, stored in a data buffer 510, processed at data processing unit 512, and sent to the surface 514 through a communication unit 316, which may comprise a downhole telemetry system.

In certain embodiments, the responses from the receivers 1-M may be measured with respect to the signals from the transmitters 1-N that generated the responses. In certain embodiments, this may include comparing the measured responses to the transmitters signals. The comparison may be made, for example, downhole in the data processing unit 512, or at an information handling system at the surface. When the comparison is made downhole, the system control unit 502 may communicate the phase, amplitude, and frequency of the transmitted time-varying EM signals to the data processing unit 512, which may compare the time-varying EM signals to the measured responses from the receivers 1-M. In certain embodiments, the data processing unit 512 may determine the phase and amplitude of the measured responses, and compare the determined phase and amplitude of the measured responses to the phase and amplitude of the corresponding transmitted time-varying EM signal. Accordingly, the amplitude of the measured response may comprise an amplitude ratio or amplitude difference with respect to the transmitted time-varying EM signal, and the phase of the measured response may comprise a phase shift or difference with respect to the transmitted time-varying EM signal. As will be described below, the phase and amplitude of the measured responses may be used to identify and characterize fractures within the formation surrounding the tool.

Resistivity logging tools similar to those described above may be azimuthally sensitive based on the azimuthal orientation of the tilted receiver and/or transmitter. At a given time, the azimuthal direction in which the tool is directed may be referred to as the tool face angle. The tool face angle may be identified, for example, using orientation sensors described above. When a resistivity logging tool is placed within a borehole and rotated (e.g., during drilling operations in a LWD/MWD configuration), azimuthally sensitive measured responses of the formation surrounding the tool may be made, with the azimuthal direction of each measured response being associated with the tool face angle of the logging tool when the response was measured. If the tool is rotated at one depth, for example, measured responses along 360 degrees of rotation may be collected.

Figure 6:
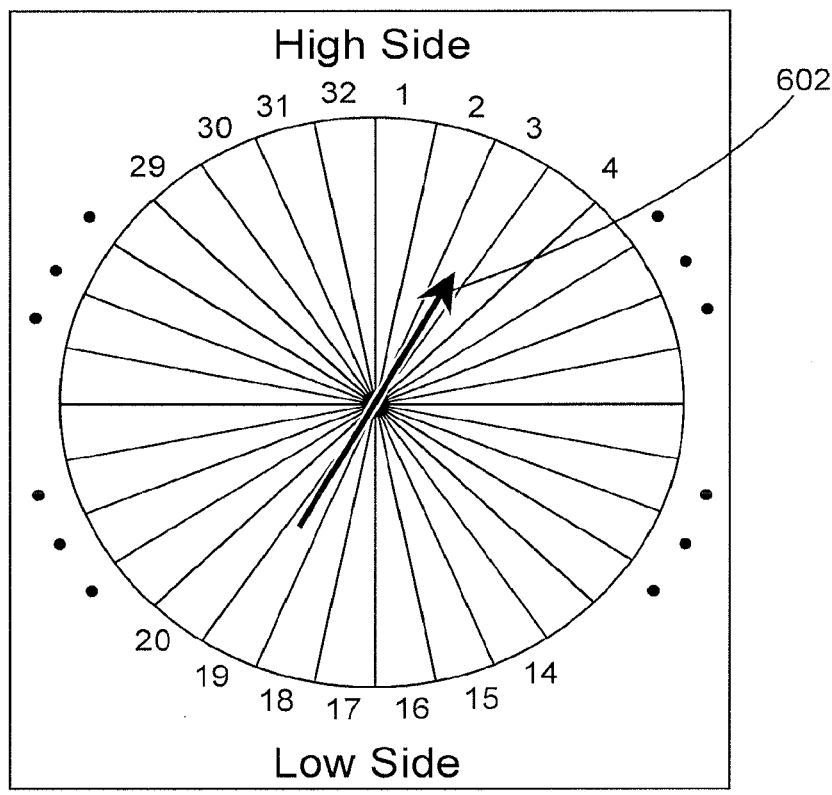
FIG. 6 is a diagram of example azimuthal bins for measurements taken using a resistivity logging tool, according to aspects of the present disclosure.

In certain embodiment, the measured responses may be divided into a plurality of azimuthal "bins" according to the tool face angle associated within the measured responses. FIG. 6 is a diagram of example bins, according to aspects of the present disclosure. Each "bin" may correspond to a range of tool face angles for the resistivity logging tool, with each bin range equal to 360/M and M equal to the number of bins. In the embodiment shown, there are 32 total bins, each corresponding to 11.25 degrees of the formation surrounding the tool. Each bin may comprise amplitudes and phases for measured responses captured when the tool face was oriented within the corresponding angular range. For example, the arrow 602 may identify the current tool face angle for a tool and the bin (bin 3) in which measured responses taken at that tool face angle will be stored. The bins may be numbered to identify the bins with respect to one another. In the embodiment shown, bin 1 corresponds to a zero degree tool face angle, perpendicular to the axis of the tool, with bin 17 corresponding to a 180 degree tool face angle, opposite bin 1. In certain embodiments, as will also be described below, the bin numbering may be changed to reduce the computational burden of identifying and characterizing a formation fracture.

In certain embodiments, measurements for each of the bins may be calculated based on the measured response of the formation in one azimuthal orientation. Although the tilted magnetic dipoles have the greatest azimuthal sensitivity in one azimuthal direction, the tilted magnetic dipole may also collect responses regarding the formation in other azimuthal directions. According to aspects of the present disclosure, the formation response measured by a magnetic dipole in a first azimuthal direction may be processed, and the response contributions from the formation in other azimuthal angles may be extracted, adjusted, and segregated into azimuthal bins, similar to those described above.

According to aspects of the present disclosure, the amplitudes and phases of the responses associated with each bin may be processed to determine resistivity values for each bin. As described above, a resistivity logging tool may comprise at least one transmitter $T_1$ and at least two receivers $R_1$ and $R_2$, with time-varying EM signals transmitted by the transmitter $T_1$ causing formation responses to be measured at receivers $R_1$ and $R_2$ along the tool. The time-varying EM signals transmitted by transmitter $T_1$ and the measured responses at the receivers $R_1$ and $R_2$ may be characterized by amplitude and phase values. In certain embodiments, the difference in amplitude and phase between the measured responses at $R_1$ and $R_2$ to a signal generated by the transmitter $T_1$ may be calculated using Equations (1) and (2)

$$\Delta A_{T1}(k) = 20 \log(A_{R1T1}(k)) - 20 \log(A_{R2T1}(k)) \qquad \text{Equation (1)}$$

$$\Delta \phi_{T1}(k) = \phi_{R1T1}(k) - \phi_{R2T1}(k) \qquad \text{Equation (2)}$$

where A* comprises amplitude, $\phi$* comprises phase, R* comprises a receiver, T* comprises a transmitter, and k comprises the bin number. In particular, $A_{R1T1}(k)$ comprises the amplitude of the measured response from receiver $R_1$ to a signal generated by the source $T_1$ at the $k^{th}$ bin position; $A_{R2T1}(k)$ comprises the amplitude of the measured response from receiver $R_2$ to a signal generated by the source $T_1$ at the $k^{th}$ bin position; $\phi_{R1T1}(k)$ comprises the phase of the measured response from receiver $R_1$ to a signal generated by the source $T_1$ at the $k^{th}$ bin position; and $\phi_{R2T1}(k)$ comprises the phase of the measured response from receiver $R_1$ to a signal generated by the source $T_1$ at the $k^{th}$ bin position. A resistivity value for the bin may be calculated using a look-up table or an inversion algorithm and the values calculated using equations (1) and (2).

In certain embodiments, processing the measured responses may further comprise calculating at least one of a compensated signal for the bins using the phase shift and attenuation information, and using the calculated compensated signal to calculate a resistivity value for each bin. In addition to the amplitude and phase values calculated for transmitter $T_1$, similar amplitude and phase values corresponding to a given bin may be calculated for the other transmitters of a resistivity logging tool, some of which may form symmetric pairs, such as transmitters $T_1$-$T_1'$, $T_2$-$T_2'$, and $T_3$-$T_3'$ from FIG. 4. In certain embodiments, a compensated signal may be generated by averaging together the responses for at least one symmetric pair of transmitters. For example, when a resistivity logging tool comprises a symmetric pair of transmitters $T_1$ and $T_1'$, equations (1) and (2) may be used to calculate attenuation and phase values for each of the transmitters (e.g., $\Delta A_{T1}(k)$, $\Delta\phi_{T1}(k)$ $\Delta A_{T1'}(k)$, and $\Delta\phi_{T1'}(k)$), and the attenuation and phase values may be averaged using the following equations to form compensated attenuation and phase values:

$$\Delta A_{T1T1'}(k) = (\Delta A_{T1}(k) + \Delta A_{T1'}(k))/2 \quad \text{Equation (3)}$$

$$\Delta\phi_{T1T1'}(k) = (\Delta\phi_{T1}(k) + \Delta\phi_{T1'}(k))/2 \quad \text{Equation (4)}$$

A resistivity value for the bin may be calculated using a look-up table or an inversion algorithm and the values calculated using equations (3) and (4).

In certain embodiments, an averaged compensated value may be calculated by averaging together the compensated values from at least two symmetric pairs of transmitters. For example, assuming a resistivity logging tool comprises symmetric pairs $T_1$-$T_1'$ and $T_2$-$T_2'$, equations (1)-(4) may be used to calculate attenuation and phase values and compensated values for each transmitter and symmetric pair, respectively, and compensated values for the symmetric pairs $T_1$-$T_1'$ and $T_2$-$T_2'$ may be averaged together. A look-up table or inversion algorithm may also be used to calculate a resistivity value for the bin based on the averaged compensated value.

In another embodiment the resistivity values for each one of the bins may be calculated using a look-up table or inversion algorithm and a geo-signal. As used herein, a geo-signal may be calculated by taking the difference between the phase or log amplitude for one bin and the average phase or log amplitude for all of the bins at a given axial location. For example, a geo-signal may be calculated for a receiver $R_1$ and transmitter $T_1$ using the following equations:

$$\text{geo\_att}_{R1T1}(k) = 20\log(A_{R1T1}(k)) - (1/32)\sum_{i=1,m} 20\log(A_{R1T1}(i)) \quad \text{Equation (5)}$$

$$\text{geo\_pha}_{R1T1}(k) = \phi_{R1T1}(k) - (1/m)\sum_{i=1,m} \phi_{R1T1}(i) \quad \text{Equation (6)}$$

where geo* comprises a geosignal, att* comprises attenuation, *pha comprises phase, A* comprises amplitude, $\phi$* comprises phase, R* comprises a receiver, T* comprises a transmitter, and k comprises the bin number, and m comprises the total number of bins.

Figure 7:
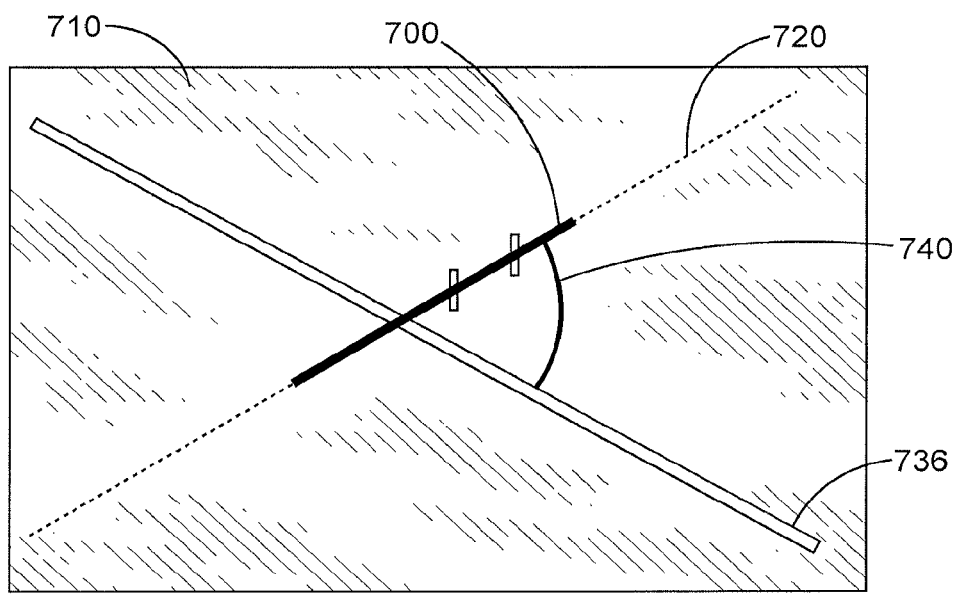
FIG. 7 is a diagram of a model of an example resistivity logging tool in a formation with at least one fracture, according to aspects of the present disclosure.

According to aspects of the present disclosure, the resistivity values calculated above may be used to form induction or propagation resistivity images of a formation, which can in turn be used to identify and characterize fractures within a formation. FIG. 7 is a diagram of an example resistivity logging tool in a formation with at least one fracture, according to aspects of the present disclosure. The tool 700 is positioned within the formation 710 along an axis 720 corresponding to the longitudinal axis of the tool 700. As described above, the tool 700 may comprise a LWD/MWD tool or a wireline tool. The formation 710 comprises a fracture 730 through which the tool 700 is passing. The tool 700 may be oriented at a "dip angle" 740 with respect to the fracture 730, corresponding to the angle between the axis 720 and the fracture 730.

The tool 700 may take at least one azimuthally sensitive formation response measurement of the formation 710, which may be used to calculate resistivity values for the formation 710, as described above. In certain embodiments, azimuthally sensitive formation response measurements may be taken at more than one axial location along the axis 720, corresponding to depths of the formation. For example, the azimuthally sensitive measurements may be taken constantly, or near-constantly, to provide detailed 360 degree measurements of the formation 710 at each depth encountered by the tool. In other embodiments, azimuthally and axially limited measurements may be taken from which 360 degree measurements at multiple depths may be calculated. As will be described below, the resistivity values calculated using the measurements may change as the tool 700 nears the fracture 730, and the fracture 730 may be identified and characterized based of the changing resistivity values.

Figure 8:
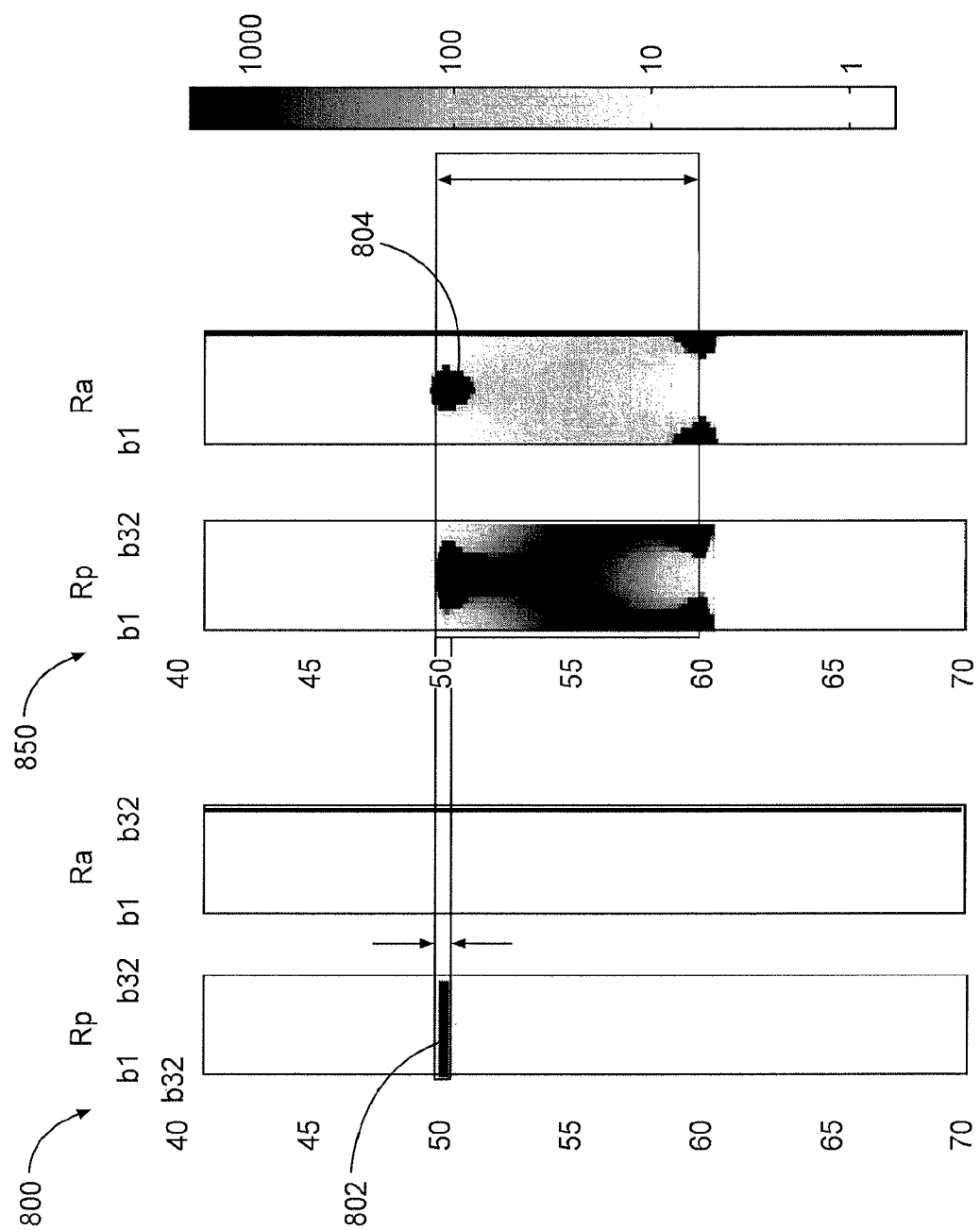
FIG. 8 are graphs illustrating example propagation resistivity images, according to aspects of the present disclosure.

The azimuthally and axially distinct resistivity values may be combined into an induction or propagation resistivity image of the formation. FIG. 8 is a diagram illustrating example propagation resistivity images 800 and 850. As can be seen, the images 800 and 850 comprise graphs that plot the resistivity values of the formation in terms of depth of the formation in feet (y-axes) and azimuthal orientation by bin number (x-axes). Notably, each of the images 800 and 850 comprises an Rp section and a Ra section, corresponding to the resistivity values calculated using the phase measurements and amplitude measurements from the resistivity logging tools, respectively.

Figure 9:
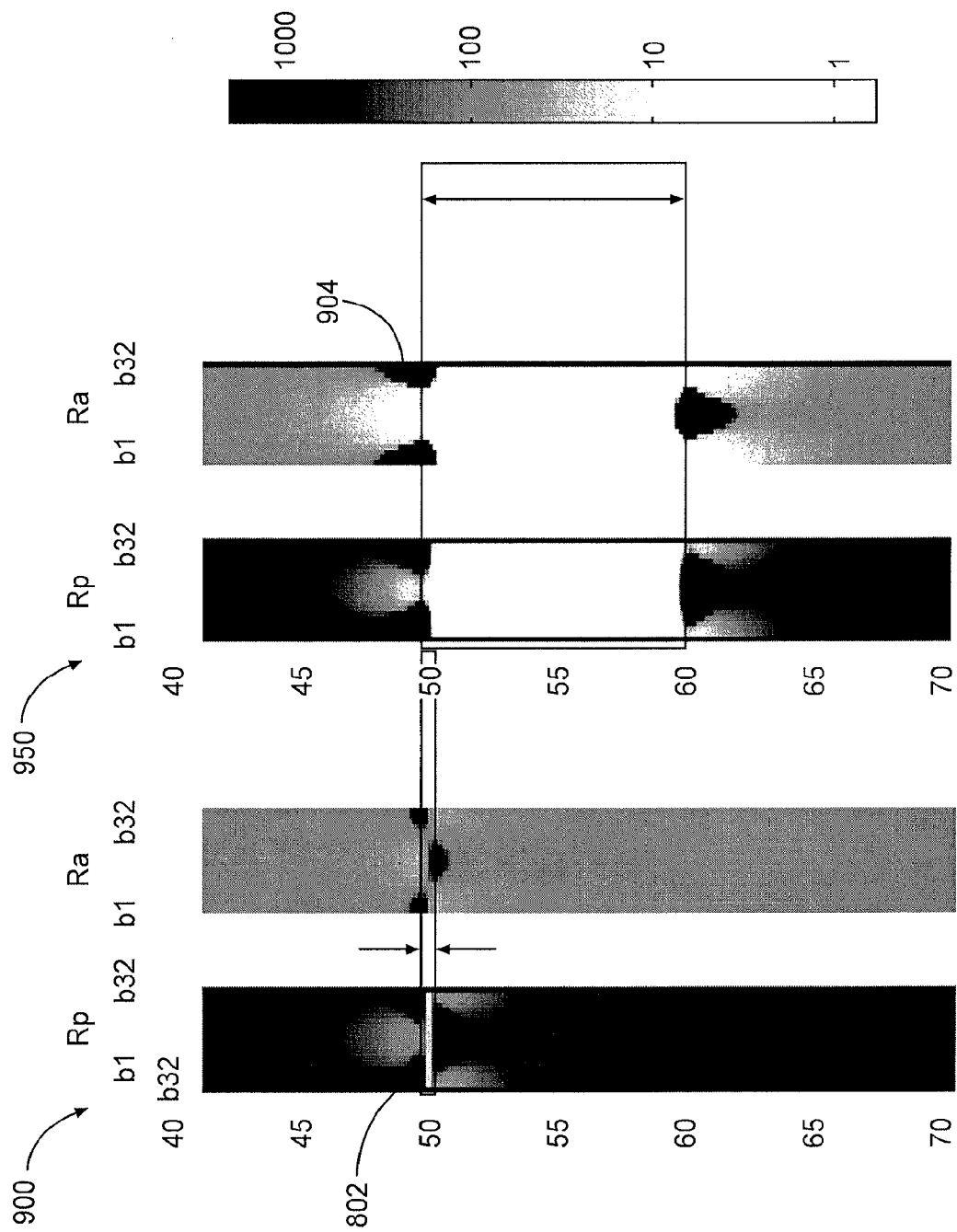
FIG. 9 are graphs illustrating example propagation resistivity images, according to aspects of the present disclosure.

The images 800 and 850 illustrate resistive features in an otherwise homogenously conductive formation. Image 800, for example, identifies a resistive 1.2 inch fracture 802 at a depth of 50 feet in the conductive formation. Image 850, in contrast, identifies a 10 foot resistive layer 804 of the otherwise homogenous formation. FIG. 9 illustrates similar images 900 and 950 to those in FIG. 8, except that the 1.2 inch fracture 902 in image 900 comprises a conductive 1.2 inch fracture in an otherwise homogenously resistive formation, and 10 foot layer 904 comprises a conductive layer in the resistive formation. The resistive and conductive portions of the images are identifiable through their corresponding resistivity values. In images 800, 850, 900, and 950, the darker colors are associated with higher resistivity values and the lighter colors are associated within lower resistivity values. By identifying abrupt changes in resistivity values, illustrated by the abrupt dark-to-light and light-to-dark changes in FIGS. 8 and 9, fractures may be identified. For example, a first set of resistivity values that are higher that the resistivity values in adjacent depths and azimuthal orientations may indicate a resistive fracture in a conductive formation, illustrated by the dark section within the otherwise light background in FIG. 8. Conversely, a second set of resistivity values that are lower that the resistivity values in adjacent depths and azimuthal orientations may indicate a conductive fracture in a resistive formation, illustrated by the light section within the otherwise dark background in FIG. 9.

Figure 10:
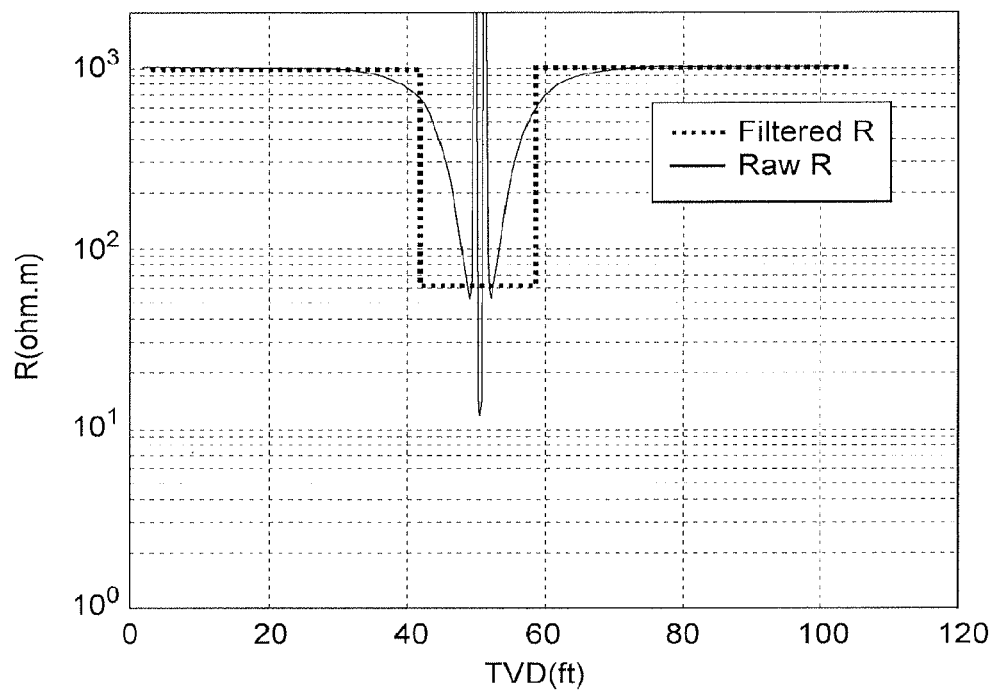
FIG. 10 is a graph illustrating phase resistivity values, according to aspects of the present disclosure.
Figure 11:
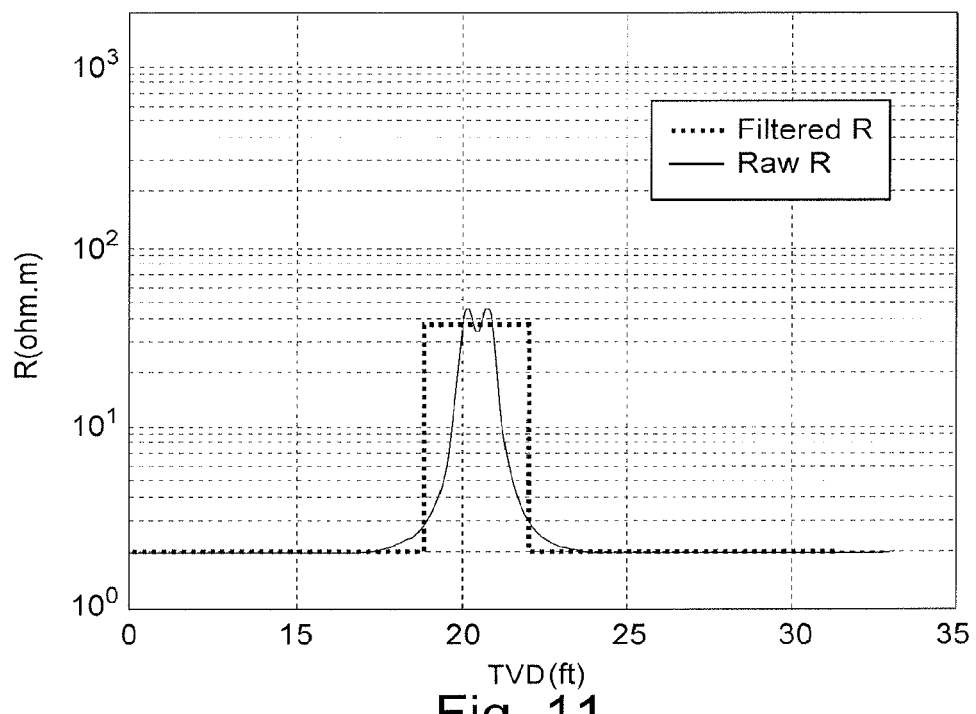
FIG. 11 is a graph illustrating phase resistivity values, according to aspects of the present disclosure.

In certain embodiments, filters may be applied to the induction or propagation resistivity images to cancel the polarization effect on the boundaries of the fracture and to enhance the resistivity contrast between the fracture and the surrounding formation. One example filter is a binary filter than utilizes a threshold level and sets at a first value any resistivity value below the threshold and sets at a second value any resistivity value above the threshold. FIGS. 10 and 11 are charts illustrating phase resistivity values as a solid line and filtered phase resistivity values as a dashed line for a 0.9 foot fracture at 21 feet of depth. As can be seen, the filtered resistivity values provide a step contrast at the top of the fracture and the bottom of the fracture with respect to the depth in the formation, with the fracture in FIG. 10 comprising a conductive fracture (high-low-high) and the fracture in FIG. 11 comprising a resistive fracture (low-high-low). Notably, the step contrast of the filtered resistivity values may simplify the image processing techniques needed to located and characterize a fracture.

Figure 12:
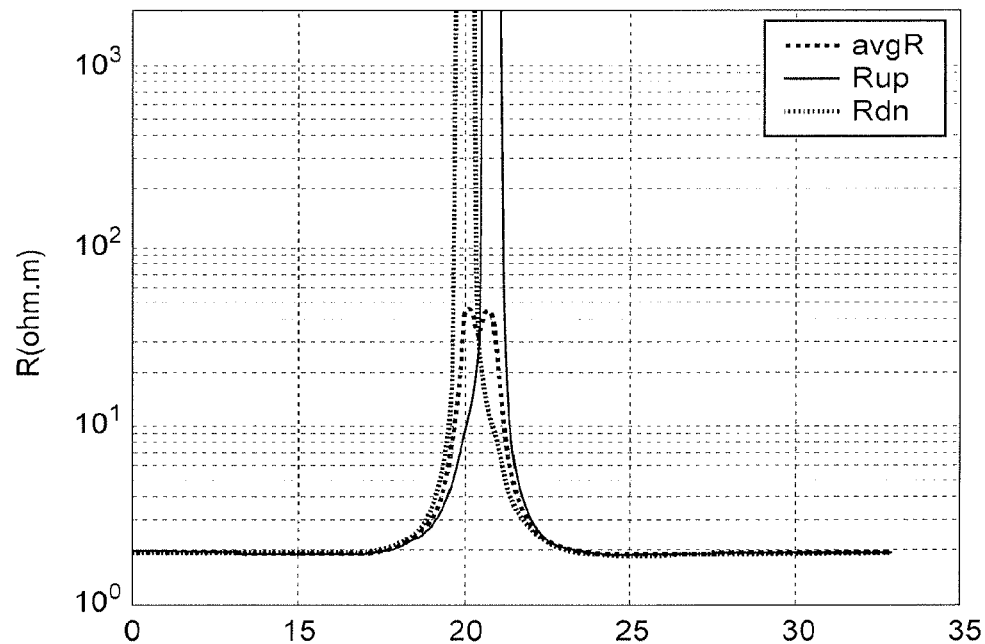
FIG. 12 is a graph illustrating the azimuthal response of two bins of a resistivity logging apparatus to a resistive fracture in a conductive formation, according to aspects of the present disclosure.

In certain embodiments, the azimuthal angle between the fracture and the tool also may be determined from the filtered resistivity values and/or induction or propagation resistivity images, although filtering is not required. For example, the azimuthal angle may be determined by identifying the bin in which the fracture is first detected. FIG. 12 is a diagram illustrating the azimuthal response of two bins of a resistivity logging apparatus to a resistive fracture in a conductive formation, according to aspects of the present disclosure. The two bins comprise a Rup bin, corresponding to the bin pointed away from the fracture, and an Rdn bin opposite the Rup bin and pointed toward the fracture. FIG. 12 further plots the average resistivity value for the tool Ravg. As can be seen, when the tool nears an upper boundary of a resistive fracture, the Rdn bin will show an increased resistivity value before the Rup bin, due to its azimuthal position with respect to the fracture. As the tool approaches the lower boundary of the fracture, the resistivity value of the Rdn bin will drop due to the surrounding conductive formation, while the resistivity value for the Rup bin will increase. Accordingly, the measurement directly up, or away from the fracture will represent the minimum resistivity response from the fracture and the measurement directly down, or towards the fracture will represent the maximum resistivity value.

Figure 13:
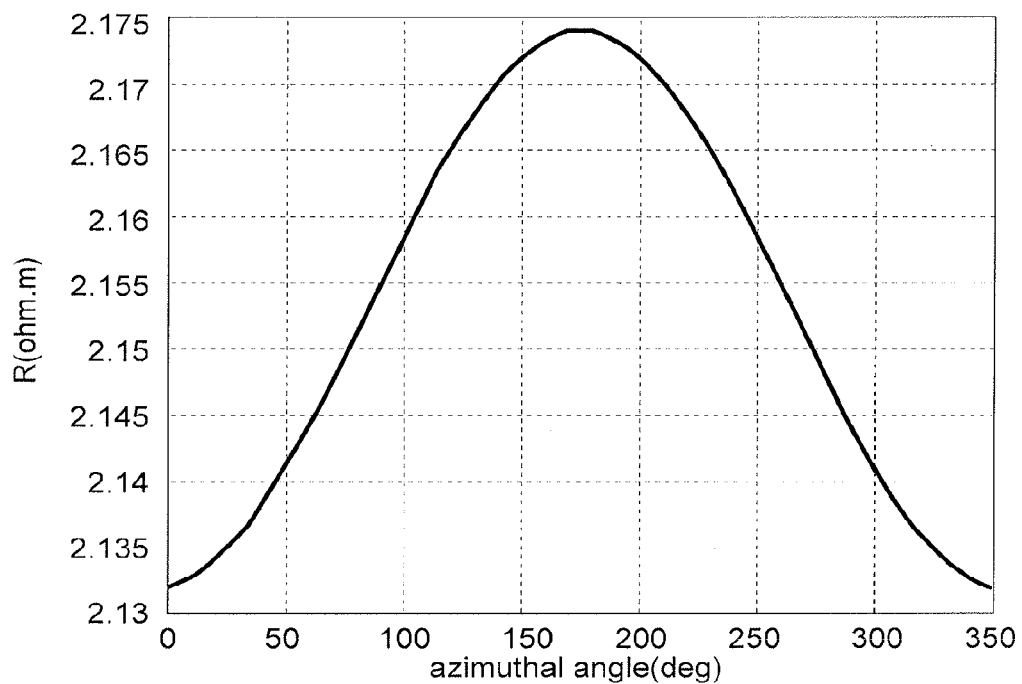
FIG. 13 is a graph illustrating an example azimuthal resistivity response, according to aspects of the present disclosure.

Additionally, the azimuthal angle may be determined by identifying resistivity maximums and minimum with respect to axial locations in the borehole. FIG. 13 is a diagram illustrating an example azimuthal resistivity response at one depth within a borehole, according to aspects of the present disclosure. As can be seen, the azimuthal resistivity response is a waveform with a minimum corresponding to a zero angle and a maximum corresponding to a 180 degree angle, opposite the zero angle. Depending on the type of formation and fracture (i.e., conductive versus resistive) the facture may be azimuthally located at either the maximum or minimum resistivity value in the graph. In certain embodiments, a curve fitting method may be used to generate the substantially sine-wave shape and to smooth the responses to better identify the maximum and minimum resistivity values with respect to azimuthal angle. Similar responses may be generated throughout a fracture bed, and the combined results may be used to accurately identify the azimuthal angle of the fracture.

Figure 14:
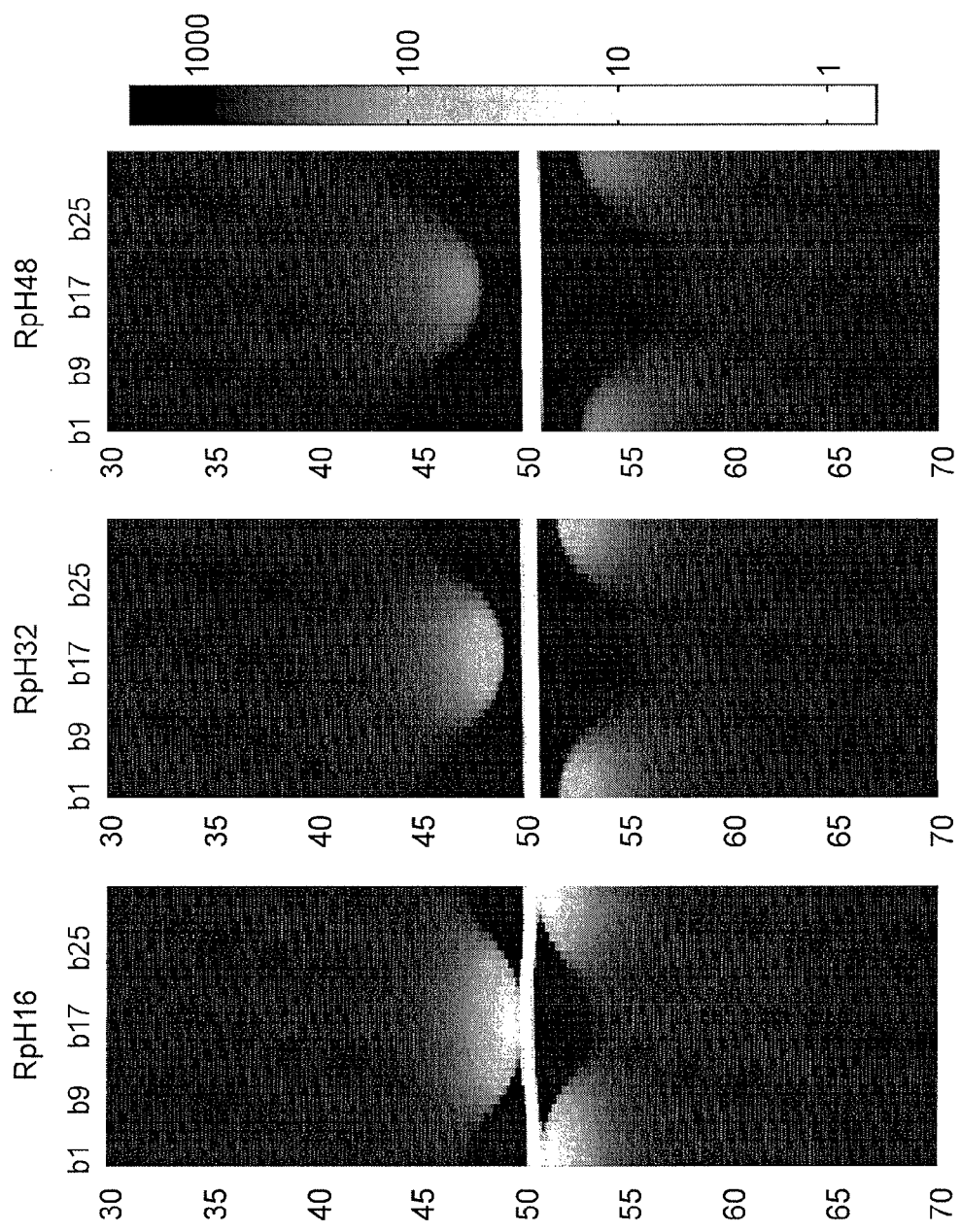
FIG. 14 illustrates graphs showing example reoriented propagation resistivity images of fractures, according to aspects of the present disclosure.

In certain embodiments, once the azimuthal angle of the fracture is identified, the bins may be renumbered so that the upper boundary of the fracture is located at bin 1 and the lower boundary is opposite bin 1. For example, depending on the type of formation, Rup or Rdn may be set to correspond to bin 1 and the other one of Rup or Rdn may be set to correspond to the bin opposite bin 1. As illustrated above, the induction or propagation resistivity images may be plotted with respect to the azimuthal orientation of the resistivity values by bin number. By renumbering the bins, the induction or propagation resistivity images for different fractures may have similarly positioned induction or propagation resistivity images. Example shifted propagation resistivity images are shown in FIG. 14, where the upper boundaries of the fracture are positioned in bin 1, and the lower boundaries are positioned in the middle of the plot.

Shifting the bin numbering may simplify the computational requirements to identify and characterize the fractures. For example, if image or data processing algorithms are used, standardizing the location of the upper and lower boundaries of the fracture may simplify the algorithm. Likewise, pattern matching techniques may be used to identify fractures and determine their characteristics, including their size, shape, average resistivity values, edge locations, and orientation. If the upper and lower boundaries are similarly positioned within the induction or propagation resistivity images, the algorithms may be designed to look in designated places for the upper and lower boundaries, instead of searching within the induction or propagation resistivity images for the boundaries. Calculating the size of the fracture from the induction or propagation resistivity images may be similarly simplified.

According to aspects of the present disclosure, one pattern matching technique may comprise constructing a synthetic fracture image using model fracture characteristics. The synthetic fracture image may be compared to the identified fracture in the induction or propagation resistivity image, and the model fracture characteristics may be adjusted until the synthetic fracture image matches the fracture within a pre-determined threshold. In another embodiment, the pattern matching technique may comprise determining a set of potential fracture characteristics combinations, and for each combination of potential fracture characteristics, generating a model fracture image, correlating at least one characteristic of the modeled resistivity image with identified fracture, and determining a correlation value. The fracture characteristic with the higher correlation value may be selected. The fracture model may be a 1D, 2D or 3D simulation of electromagnetic wave propagation in downhole environment. It may be based on finite-difference, finite-element, method of moment and integral equation methods. The fracture parameters that produce the best matching are accepted as the solution.

Figure 15:
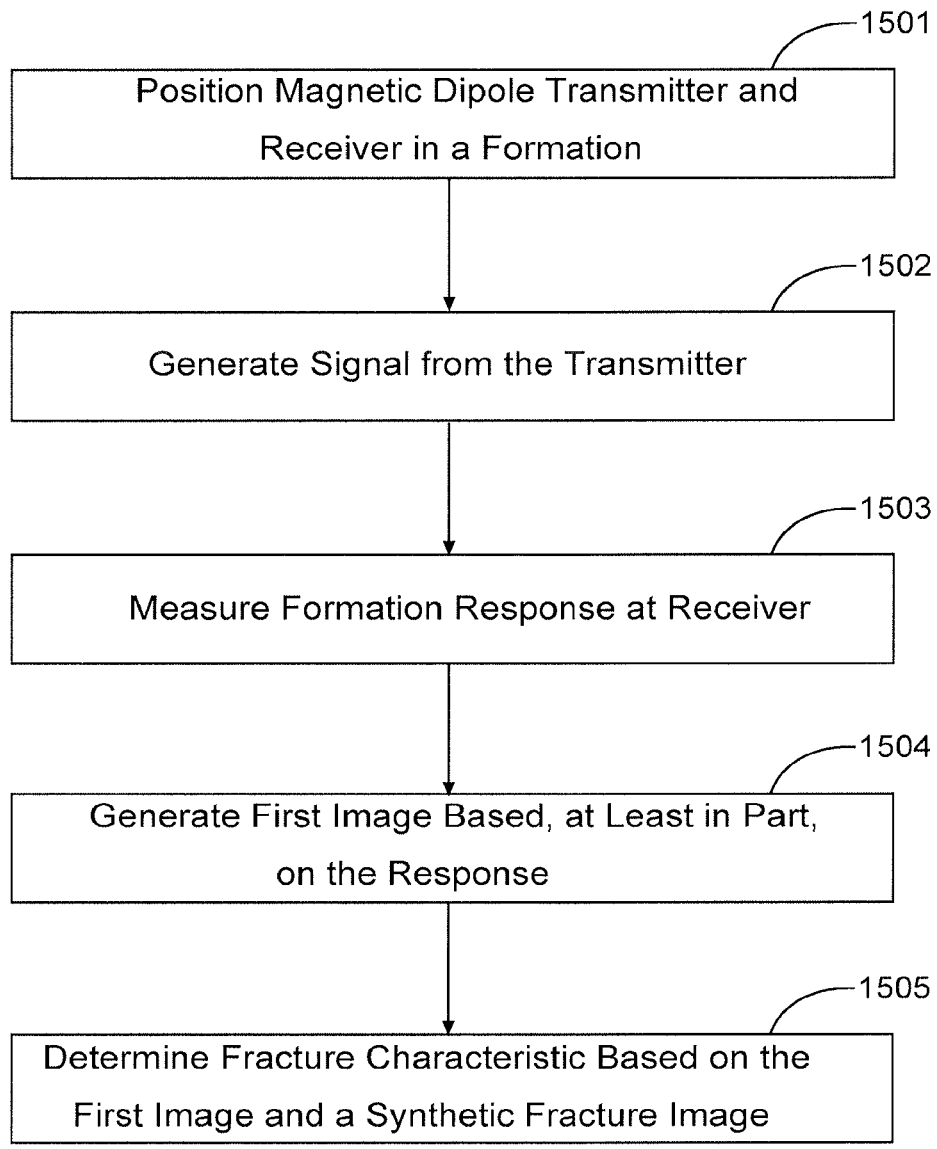
FIG. 15 is flow diagram illustrating an example process, according to aspects of the present disclosure.

FIG. 15 is a flow diagram of an example process, according to aspects of the present disclosure. Step 1501 may comprise positioning a magnetic dipole transmitter and a magnetic dipole receiver within a borehole in a subterranean formation. At least one of the magnetic dipole transmitter and the magnetic dipole receiver being tiled with respect to an axis of the borehole. In certain embodiments, both of the magnetic dipole transmitter and the magnetic dipole receiver may be tilted with respect to the axis of the borehole. The magnetic dipole transmitter and the magnetic dipole receiver may be coupled, for example, to a wireline tool or a LWD element of a drilling assembly.

Step 1502 may comprise generating a time-varying EM signal with the magnetic dipole transmitter, and step 1503 may comprise measuring a response of the formation to the time-varying EM signal using the magnetic dipole receiver. The response may include at least two depths of a formation and at least two azimuthal orientations of the formation with respect to the axis of the borehole. In certain embodiments, the response may comprise amplitude, phase, and attenuation values of the formation to the EM signal. In certain embodiments, measuring the response may comprise receiving a first measurement from the magnetic dipole receiver corresponding to a first azimuthal orientation with respect to the axis of the borehole and calculating a second measurement corresponding to a second azimuthal orientation with respect to the axis of the borehole.

Step 1504 may comprise generating an image of the formation based, at least in part, on the response. The response may be divided into azimuthal bins, and each depth or layer of the borehole or formation may have a separate group of azimuthal bins. The image of the formation may be generated by plotting a visualization of the azimuthally- and depth-oriented response values. In certain embodiments, generating the first image of the formation based, at least in part, on the response and the synthetic fracture image comprises generating the first image of the formation using at least one of phase values from the response, amplitude values from the response, attenuation values from the response, and resistivity values calculated using at least one of the phase values, amplitude values, and attenuation values from the response. In certain embodiments, calculating the separate resistivity values may comprise calculating at least one of a geosignal and a compensated signal for each of the azimuthal bins and determining the separate resistivity value for each of the plurality of bins using the calculated geosignal or compensated signal and at least one of a look-up table and an inversion algorithm.

Step 1505 may comprise determining at least one fracture characteristic based, at least on part, on the first image and a synthetic fracture image. In certain embodiments, determining at least one fracture characteristic based, at least on part, on the first image and the synthetic fracture image may comprise constructing the synthetic fracture image using model fracture characteristics and comparing the synthetic fracture image to feature in the first image. The feature in the first image may comprise a portion or section of the first image that is suspected of containing a fracture. The model fracture characteristics may be adjusted until the synthetic fracture image matches the feature within a threshold.

In other embodiments, determining at least one fracture characteristic based, at least on part, on the first image and the synthetic fracture image may comprise determining a set of potential model fracture characteristics combinations and for each combination of potential model fracture characteristics, generating a synthetic fracture image, correlating a first feature of the synthetic image with a second feature in the first image, and determining a correlation value. As described above, the feature of the first image may comprise a portion of the first image. The potential model fracture characteristic with the highest correlation value may then be selected as the fracture characteristic for the first image.

In certain embodiments, correlating the first feature of the synthetic image with the second feature in the first image may include determining a type of the second feature. In certain embodiments, a type of the second feature may be determined by determining if the second feature comprises one of a first set of resistivity values that are higher than the resistivity values at adjacent depths in the formation, and a second set of resistivity values that are lower than the resistivity values at adjacent depths in the formation.

An azimuthal shift and a depth shift between the first feature and second feature may be determined. An azimuthal orientation of the second feature may be identified by determining a first azimuthal orientation pointing away from the second feature and a second azimuthal orientation pointing toward the second feature based on the type of the second feature. One of the first image and the synthetic fracture image so that the first feature and second feature are aligned in azimuth and depth.

The methods described above may be implemented in a system with a magnetic dipole transmitter and receiver and an information handling system communicably coupled to the magnetic dipole receivers. The information handling system may comprise a processor and a set of instructions that when executed by the processor cause the processor to generate a time-varying electromagnetic (EM) signal with the magnetic dipole transmitter; measure a response of the formation to the time-varying EM signal using the magnetic dipole receiver, the response comprising at least two depths of a formation and at least two azimuthal orientations of the formation with respect to the axis of the tool body; generate a first image of the formation based, at least in part, on the response; and determine at least one fracture characteristic based, at least on part, on the first image and a synthetic fracture image. The fracture characteristic may comprise at least one of a presence of a fracture and/or the shape, size, average resistivity value, and/or edge location of the fracture.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for fracture identification and characterization, comprising:
    positioning a magnetic dipole transmitter and a magnetic dipole receiver within a borehole in a subterranean formation, at least one of the magnetic dipole transmitter and the magnetic dipole receiver being tilted with respect to an axis of the borehole;
    generating a time-varying electromagnetic (EM) signal with the magnetic dipole transmitter;

measuring a response of the formation to the time-varying EM signal using the magnetic dipole receiver, the response comprising at least two depths of the formation and at least two azimuthal orientations of the formation with respect to the axis of the borehole;

generating a first image of the formation based, at least in part, on the response; and determining at least one fracture characteristic based, at least on part, on the first image and a synthetic fracture image, wherein determining at least one fracture characteristic based, at least on part, on the first image and the synthetic fracture image comprises determining at least one of a presence, shape, size, average resistivity value, and edge location of the fracture.

2. The method of claim 1, wherein generating the first image of the formation based, at least in part, on the response and the synthetic fracture image comprises generating the first image of the formation using at least one of phase values from the response;

amplitude values from the response;

attenuation values from the response; and resistivity values calculated using at least one of the phase values, amplitude values, and attenuation values from the response.

3. The method of claim 1, wherein determining at least one fracture characteristic based, at least on part, on the first image and the synthetic fracture image comprises constructing the synthetic fracture image using model fracture characteristics;

comparing the synthetic fracture image to a feature in the first image; and adjusting the model fracture characteristics until the synthetic fracture image matches the feature within a threshold.

4. The method of claim 1, wherein determining at least one fracture characteristic based, at least on part, on the first image and the synthetic fracture image comprises determining a set of potential model fracture characteristics combinations;

for each combination of potential model fracture characteristics, generating a synthetic fracture image from the combination of potential model fracture characteristics;

correlating a first feature of the synthetic fracture image with a second feature in the first image; and determining a correlation value; and determining the potential model fracture characteristic with the highest correlation value among all combinations of potential model fracture characteristics.

5. The method of claim 4, wherein correlating the first feature of the synthetic fracture image with the second feature in the first image comprises determining a type of the second feature;

identifying an azimuthal shift between the first feature and the second feature;

identifying a depth shift between the first feature and the second feature; and shifting one of the first image and the synthetic fracture image so that the first feature and the second feature are aligned in azimuth and depth.

6. The method of claim 5, wherein determining the correlation value comprises calculating the correlation of image values between the shifted one of the first image and the synthetic fracture image and other one of the first image and the synthetic fracture image.

7. The method of claim 5, wherein determining the type of the second feature comprises determining if the feature comprises one of a first set of resistivity values that are higher than the resistivity values at adjacent depths in the formation; and a second set of resistivity values that are lower than the resistivity values at adjacent depths in the formation.

8. The method of claim 1, wherein both the magnetic dipole transmitter and the magnetic dipole receiver are tilted with respect to the axis of the borehole.

9. The method of claim 1, wherein the magnetic dipole transmitter and the magnetic dipole receiver are co-located with respect to the axis of the borehole.

10. A system for fracture identification and characterization, comprising:

a magnetic dipole transmitter coupled to a tool body;

a magnetic dipole receiver coupled to the tool body, at least one of the magnetic dipole transmitter and the magnetic dipole receiver being tiled with respect to an axis of the tool body;

an information handling system communicably coupled to the magnetic dipole transmitter and the magnetic dipole receiver, the information handling system comprising a processor and a memory device coupled to the processor, the memory device containing a set of instruction that, when executed by the processor, cause the processor to:

generate a time-varying electromagnetic (EM) signal with the magnetic dipole transmitter;

measure a response of the formation to the time-varying EM signal using the magnetic dipole receiver, the response comprising at least two depths of a formation and at least two azimuthal orientations of the formation with respect to the axis of the tool body;

generate a first image of the formation based, at least in part, on the response; and determine at least one fracture characteristic based, at least on part, on the first image and a synthetic fracture image, wherein the fracture characteristic comprises at least one of a presence, shape, size, average resistivity value, and edge location of the fracture.

11. The system of claim 10, wherein the set of instructions that causes the processor to generate the first image of the formation based, at least in part, on the response and the synthetic fracture image further causes the processor to generate the first image of the formation using at least one of phase values from the response;

amplitude values from the response;

attenuation values from the response; and resistivity values calculated using at least one of the phase values, amplitude values, and attenuation values from the response.

12. The system of claim 10, wherein the set of instructions that causes the processor to determine at least one fracture characteristic based, at least on part, on the first image and the synthetic fracture image further causes the processor to construct the synthetic fracture image using model fracture characteristics;

compare the synthetic fracture image to a feature in the first image; and adjust the model fracture characteristics until the synthetic fracture image matches the feature within a threshold.

13. The system of claim 10, wherein the set of instructions that causes the processor to determine at least one fracture characteristic based, at least on part, on the first image and the synthetic fracture image further causes the processor to
- determine a set of potential model fracture characteristics combinations;
- for each combination of potential model fracture characteristics,
  - generate a synthetic fracture image from the combination of potential model fracture characteristics;
  - correlate a first feature of the synthetic fracture image with a second feature in the first image; and
  - determine a correlation value; and
- determine the potential model fracture characteristic with the highest correlation value among all combinations of potential model fracture characteristics.

14. The system of claim 13, wherein the set of instructions that causes the processor to correlate the first feature of the synthetic fracture image with the second feature in the first image further causes the processor to
- determine a type of the second feature;
- identify an azimuthal shift between the first feature and the second feature;
- identify a depth shift between the first feature and the second feature; and
- shift one of the first image and the synthetic fracture image so that the first feature and the second feature are aligned in azimuth and depth.

15. The system of claim 14, wherein the set of instructions that causes the processor to determine the correlation value further causes the processor to calculate the correlation of image values between the shifted one of the first image and the synthetic fracture image and other one of the first image and the synthetic fracture image.

16. The system of claim 14, wherein the set of instructions that causes the processor to determine the type of the second feature further causes the processor to determine if the second feature comprises one of
- a first set of resistivity values that are higher than the resistivity values at adjacent depths in the formation; and
- a second set of resistivity values that are lower than the resistivity values at adjacent depths in the formation.

17. The system of claim 10, wherein both the magnetic dipole transmitter and the magnetic dipole receiver are tilted with respect to the axis of the tool body.

18. The system of claim 10, wherein the magnetic dipole transmitter and the magnetic dipole receiver are co-located on the tool body.

* * * * *